United States Patent [19]

McAnally

[11] Patent Number: 4,744,334
[45] Date of Patent: May 17, 1988

[54] SELF-CONTAINED SOLAR POWERED FLUID PUMPING AND STORAGE UNIT

[76] Inventor: Charles W. McAnally, P.O. Box 101, Alpine, Tex. 79831

[21] Appl. No.: 946,764

[22] Filed: Dec. 29, 1986

[51] Int. Cl.$^4$ ............................................. A01K 7/00
[52] U.S. Cl. .................................... 119/78; 126/437; 417/411; 417/415
[58] Field of Search ............... 126/435, 437, 450, 419, 126/422; 119/73, 78, 79, 72, 74, 75, 76; 417/411, 415

[56] References Cited

U.S. PATENT DOCUMENTS

| | | | |
|---|---|---|---|
| 838,961 | 12/1906 | Diehl | 119/78 |
| 2,511,721 | 6/1950 | Langenbahn | 119/78 |
| 3,477,408 | 11/1969 | Mull | 119/79 |
| 4,147,157 | 4/1979 | Zakhariya | 126/419 |
| 4,300,537 | 11/1981 | Davis | 126/437 |
| 4,586,879 | 5/1986 | Slater | 417/411 |

OTHER PUBLICATIONS

Blue Sky Water Supply, Blue Sky Water Supply Co., Billings, MT, 12/6/1982.
Dempster Hi-Efficiency Solar Pump Jack, Trisolar Co., Bedford, MA 01730.

*Primary Examiner*—James C. Yeung
*Attorney, Agent, or Firm*—Cox & Smith Inc.

[57] ABSTRACT

A self-contained, solar powered unit predominately used for watering livestock. Fundamentally, the preferred embodiment of the unit is an integrated combination which utilizes a solar collecting panel to generate electricity for powering a fluid pump that pumps fluid into a reservoir tank. The reservoir tank, further, supplies fluid to an adjoined watering trough for access by livestock. The unit is simple, compact, and thus, highly portable while its operation is economical and requires little maintenance.

7 Claims, 1 Drawing Sheet

SELF-CONTAINED SOLAR POWERED FLUID PUMPING AND STORAGE UNIT

BACKGROUND OF THE INVENTION

The present invention relates to a solar powered fluid pumping system. More particularly, it relates to a solar collecting panel combined with a fluid pump and a reservoir tank in a system which may incorporate a watering trough, predominantly utilized to provide water for livestock.

Solar pumps offer several advantages over other types of pumps. Most significantly, solar pumps can be installed in remote locations where electricity and fuels are not readily available. Solar pumps can also operate where windmills are ineffective because of lack of wind. Their sole limitation for operation is the availability of sunlight. For these reasons and others, solar powered pumps offer an attractive potential as a relatively low maintenance pump, especially in remote areas.

Unfortunately, the advancement of solar pumps has been hindered significantly by cost obstacles. The solar collecting panels are the primary contributors to the high cost. While these solar panels are an essential element of a solar pumping system, financial considerations have forced many potential users to select alternative pumping systems even in situations where solar pumps would be functionally advantageous. Since the price of the solar panel is proportionally related to its size, it is an object of the present invention to minimize this cost obstacle by using a motor with low power requirements which, in turn, reduces the necessary size of the solar collecting panel. Despite the low voltage motor, another object of the invention is to operate effectively with the use of an efficiently designed surface pump, which also avoids the high costs and installation problems caused by submersible pumps used in many other systems. The present invention, thus, is determined to greatly reduce the cost obstacle of solar pumps.

Most solar pumping systems are comprised of several separate components which are connected but which are not integrated into a single unit. Such configurations allow a buyer to select different components according to his desires; however, this leads to waste of material in structure and connections. Multicomponent layouts also tend to be more immobile due to their complexity and may require separate barriers to protect the individual components from damage by livestock or otherwise. These characteristics of multicomponent layouts are wasteful, cumbersome and, subsequently, costly.

Accordingly, it is an object of the present invention to be an integrated unit which is intended to reduce such problems. Through integration, material needs are reduced since structural materials serve multiplicative purposes, supporting several components rather than one. Connecting pipes and wires are also reduced in length because of the compact nature of the integrated structure. By mounting the solar panel and other components on top of the sturdy reservoir tank, and, thus, above the surrounding livestock, the present invention may eliminate the cost and need for a livestock barrier completely. This integration object, furthermore, enables quick and easy installation at, or movement to, virtually any well or fluid source. The object of integrated character of the present invention, thus, helps to solve the mobility and cost problems which burden other solar pump designs.

Furthermore, while many solar pumps use batteries to store electricity for use when the sun is not available, it is an object of the present invention to utilize the reservoir tank as an effective battery of water. In this way, water is stored until it is needed and the electric battery is eliminated; the pump operates whenever sunlight is available; and when the reservoir tank is full, a circuit breaker is actuated to turn off the pump until water is needed or, alternatively, fluid is redirected elsewhere. Thus, the costs, maintenance, complexities and inefficiencies inherent with electric batteries are also eliminated.

Finally, while solar pumps are used predominantly for providing water to livestock, it is an object of the present invention to provide a complete package designed for that use. The object includes a combination of the solar powered pump along with a reservoir tank and a watering trough which may be integrated into a single compact unit. This combination presents an all-in-one alternative to compiling several products for this particular use while still serving other purposes at the option of the user.

Therefore, it is a conclusive goal of the present invention to provide a unique, simple, low-cost, low-maintenance, self-contained and easily movable solar powered pumping system for use in watering livestock.

Other objects, features and advantages of the invention will become evident to those skilled in the art in light of the following detailed description, viewed in conjunction with the referenced drawings, of a preferred exemplary system according to the invention. The foregoing and following description of the invention is for exemplary purposes only. The true spirit of the invention is set forth in the appended claims.

DETAILED DESCRIPTION OF THE PREFERRED EMBODIMENT

Figure 1:
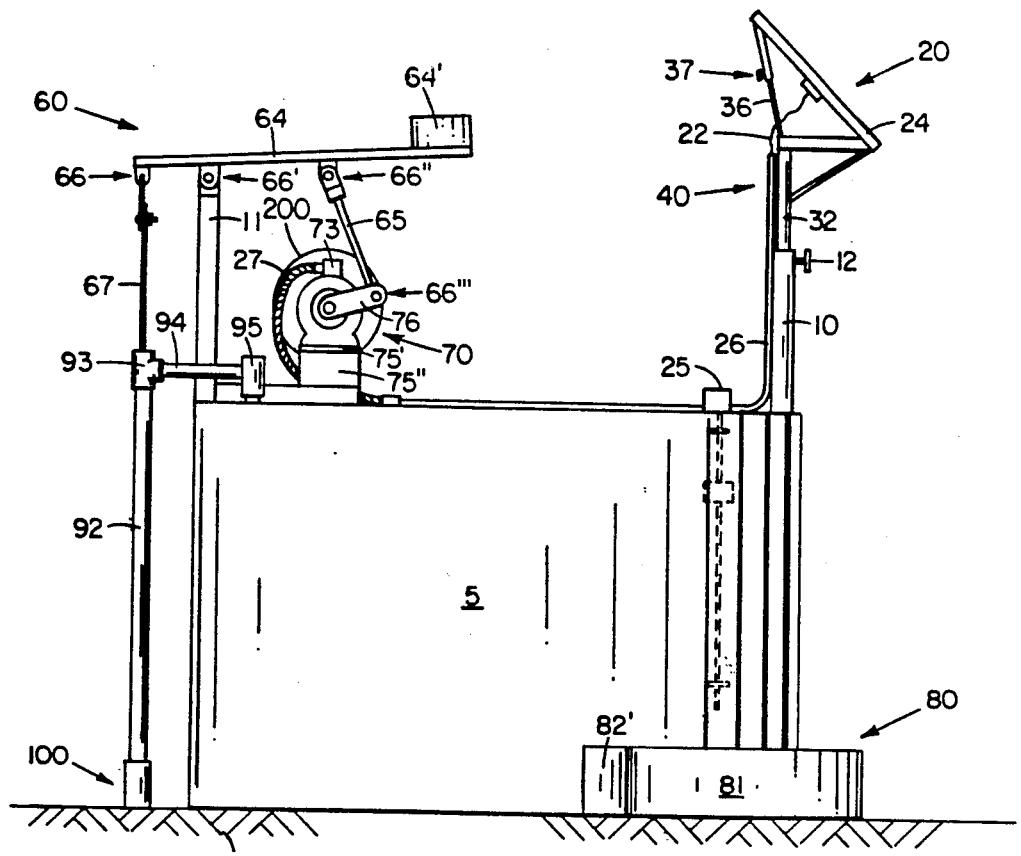
FIG. 1 is a side elevation view of the solar powered livestock watering system of the present invention.
Figure 2:
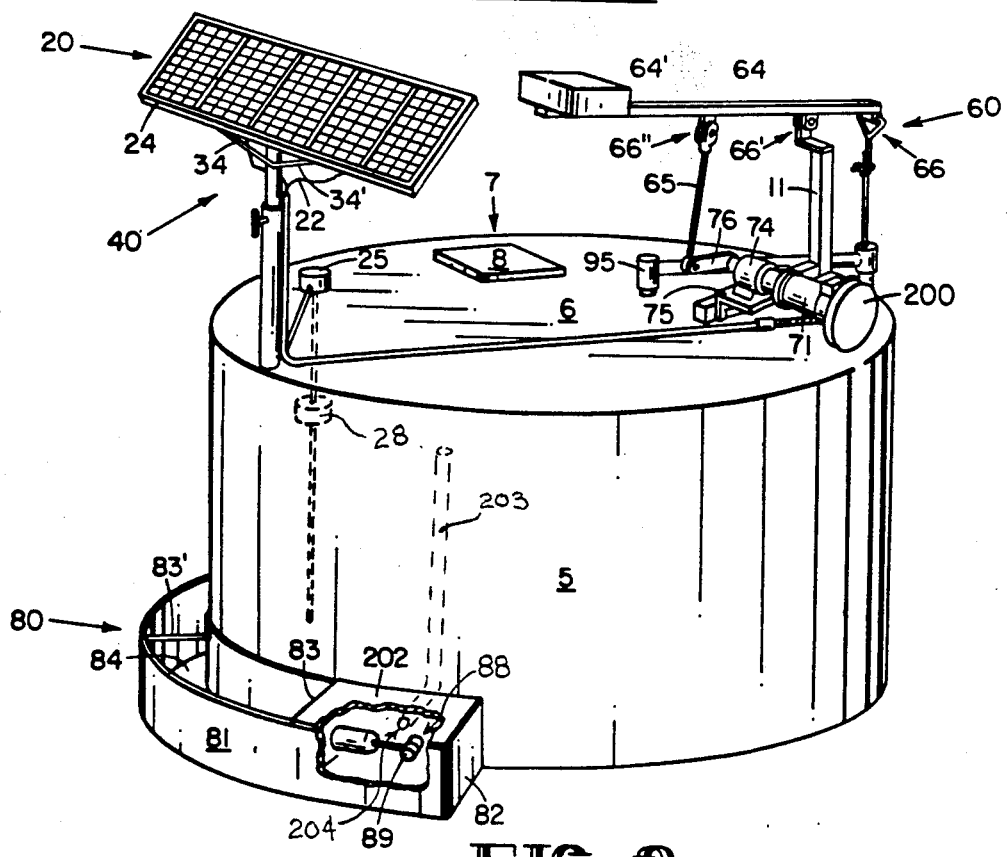
FIG. 2 is a perspective view of the solar powered livestock watering system of the present invention.

Referring to FIGS. 1 and 2, a composite unit is shown fundamentally comprised of reservoir tank 5, solar panel 20 with platform 40, means 60 for pumping fluid, and adjoined livestock watering trough 80. The integration of components 20, 40, 60 and 80, which separately might not be unique, serves to provide the present invention—a self-contained, solar powered, livestock watering system.

The invention basically operates to transform solar energy from the sun (not shown) into electrical energy which is used to pump fluid (not shown) for livestock (not shown) or other purposes. While livestock and other animals (not shown) predominantly inhibit the local environment below top face 6, components 20, 40 and 60 are mounted above top face 6 in order to create an effective barrier which protects components 20, 40 and 60 from damage by livestock and other animals.

Reservoir tank 5 is cylindrical about a vertical axis and serves as a common support structure for the invention. Tank 5 is fully enclosed but for openings at manhole 7, inlet port 9, outlet port 87 and overflow port 204. Structural stability for the invention is provided by a horizontal I-beam (not shown) which is integrated across a diameter in top face 6 of reservoir tank 5. Top face 6 is flat in the preferred embodiment, but top face 6 may be produced slightly convex in order to provide better drainage from top face 6. Producing a slightly convex top face 6 involves integrating the structural I-beam (not shown) slightly higher with respect to top face 6 in order to expose the upper level surface of the structural I-beam on which components 40 and 60 may be securely mounted. The bottom face (not shown) of reservoir tank 5 rests on level ground or foundation 101. Tank 5 must be situated next to water well or fluid supply 100 so that well pipe 92, which is of standard size, intersects with an imaginary extension (not shown) of the I-beam (previously described) and sucker rod 67 can descend vertically into well pipe 92.

Manhole 7 is square shaped with an upwardly protruding ridge (not shown) outlining its perimeter. Manhole cover 8 fits over and around the ridge in order to seal reservoir tank 5. The size of manhole 7 is adequate to allow a man to enter reservoir tank 5 for repair purposes and also enables inspection of the fluid level within reservoir tank 5. An upright ladder (not shown) may also be attached to the side of reservoir tank 5 as a means to enable easy access to manhole 7 and components 20, 40 and 60 on top face 6. An inlet pipe stem (not shown) is bonded to reservoir tank 5 at inlet port 9 so that the pipe stem protrudes upwards.

Watering trough 80 rests on ground or foundation 101 and is positioned approximately below panel 20. Trough 80 has a outer wall 81, end walls 82 and 82', supporting struts 83 and 83', and base plate 84 which are bonded together and to reservoir tank in order to retain fluid in trough 80. The lower portion of tank 5 between end walls 82 and 82' is, effectively, an inner side (not numbered) of trough 80. Outer wall 81 and the inner side of trough 80 are elongated in the horizontal direction while end walls 82 and 82' are roughly square shaped. The inner side of trough 80 is, thus, horizontally longer than walls 82 and 82'. Base plate 84 forms a horizontal, semi-annular surface which partially circumscribes reservoir tank 5 to the extent of approximately one third of the circumference of tank 5. Outer wall 81 is formed to the outer edge of base plate 84, forming an arc about the vertical axis of reservoir tank 5. Supporting struts 83 and 83' are cylindrical rods which extend horizontally from reservoir tank 5 to the top of outer wall 81. Supporting struts 83 and 83' are rigidly connected to reservoir tank 5 and outer wall 81, and supporting struts 83 and 83' are spaced to divide trough 80 into three equally sized arcs (not numbered).

Solar panel 20 is a means for collecting solar energy (not shown). Solar panel 20 has an arrangement of conventional solar modules 20', 20'', 20''', and 20'''', and 20''''' fastened to rectangular frame 24. Rectangular frame 24 forms the perimeter of panel 20. Frame 24 is comprised of a lower horizontal member, an upper horizontal member and two vertical side members (not numbered). Each member has an "L" shaped cross section (not shown). The lower member of frame 24 is pivotally connected to platform 40 which, in turn, is supported by mast 10. Upper member of frame 24 is pivotally connected to the upper ends of pitch adjusters 36.

Outlet port 88 is located on the wall of reservoir tank 5 slighlty above the bottom face (not shown) of reservoir tank 5 within trough 80 and approximately beside end wall 82. An outlet pipe stem (not shown) is bonded to reservoir tank 5 at the outlet port (previously described) to which conventional buoyed regulator valve 89, which is actuated by decreases in the fluid level within trough 80, is connected to regulate the fluid flow from tank 5 into trough 80. Port 204 is positioned on the wall of reservoir tank 5 slightly above the bottom face (not shown) of reservoir tank 5 approximately beside end wall 82. Stand pipe 203 is connected to trough 80 through port 204. Stand pipe 203 is positioned to protrude upward from port 204 with open end 205 of stand pipe 203 with reservoir tank 5 to control the upper level of fluid within the tank 5. Cover 202 is rigidly connected to reservoir tank 5, outer wall 81, and end wall 82 and is positioned above regulator valve 89 for protecting regulator valve 89 from damage by foreign intrusions into trough 81 from above regulator valve 89.

Mast 10 has the form of a hollow cylinder, and the lower end of mast 10 is fixed to the structural I-beam (previously described). Screw pin 12 loosens and tightens through a threaded bore (not numbered) in mast 10 and against platform post 32 to provide means for manual adjustment of the direction that panel 20 faces.

Platform 40, itself, consists of cylindrical platform post 32, "C" shaped base 33 and supporting struts 34 and 34'. Platform 40 is integrated to provide support for solar panel 20. Post 32, as pictured in FIGS. 1 and 2, is fully descended within mast 10 and also rests upon, but is not bonded to, the I-beam (previously described). Base 33 is composed of one long bar (not shown) and short bars 33' in a "C" shape from the top view (not pictured) with platform post 32 descending beneath the midpoint of the long bar of base 33. Supporting struts 34 and 34' are positioned to provide support between post 32 and the ends of short bars 33' that are not connected to the long bar of base 33. Supporting struts 34 and 34' are rigidly connected to post 32 and base 33. The lower member of frame 24 is pivotally connected by hinges (not shown) at the ends of short bars 33' that are not connected to the long bar of base 33.

Pitch adjusters 36 are pivotally connected by means of journal bearings (not shown) on platform base 33. Bearings connecting pitch adjusters 36 to base 33 are located at the two intersections of the long member of base 33 with short members 33'. Each pitch adjuster 36 telescopes manually by means of screw pin 37 to provide a means for adjusting the angle of panel 20 from the horizon (i.e., the pitch angle of panel 20). Each pitch adjuster 36 is, also, pivotally connected to the upper member of frame 24 by means of a journal bearing (not shown). The locations of these uppermost journal bearings connecting pitch adjusters 36 to frame 24, with respect to the upper member of panel frame 24, mirror the locations of the hinges connecting frame 24 to base 33 (previously described) with respect to the lower member of frame 24.

Electrical wires 22 from solar panel 20 are encased in electrical conduit 26 for protection and are routed down mast 20 and across top face 6 of reservoir tank 5 to circuit breaker 25. From circuit breaker 25, wires 22 are routed through electrical conduit 26 and through flexible conduit 27 to terminal box 73 of motor 71. When reservoir tank 5 is full or when the fluid level within tank 5 rises above a predetermined fluid level (not shown) which corresponds to a predetermined quantity of fluid within tank 5, circuit breaker 25 is mechanically actuated by an actuating means, a float 26, which protrudes into reservoir tank 5, and the flow of electricity to motor 70 is arrested until the fluid level in tank 5 drops below the full or predetermined level.

When the fluid level within tank 5 subsequently drops below the full or predetermined level, actuator means reinstates electrical circuit 22 to operate motor 70. Alternatively, circuit breaker 25 may be rewired to operate a means (not shown) for diverting the fluid from the composite unit rather than breaking circuit 22; thus, when reservoir tank 5 is full, pumped fluid may be redirected to an alternative receptor (not shown) for utilization of the fluid elsewhere.

Motor component 70 consists of conventional low voltage D.C. motor 71 with appropriate reduction unit 72 and is mounted to small platform 75 above top face 6 of reservoir tank 5. The shaft (not numbered) of motor 70. Flywheel 200 and crank 76 are rigidly connected to the shaft of motor 71. The shaft of motor 71 drives crank 76. Small platform 75 consists of horizontal plate 75' bonded to vertical plate 75". A cross-section of small platform 75 has the shape of an inverted "L". Crank 76 rotates parallel to and beside vertical plate 75".

The lower portion of vertical plate 75" is bonded to stand 11. Vertical plate 75" of platform 75 has sufficient height to enable clearance for the rotation of crank 76. Stand 11 is an "L" shaped configuration of two I-beam members and is bonded to the structural I-beam (previously described) in order to insure stability.

Pump 60 is a fluid pumping means which draws fluid through vertical pipe 92. Vertical pipe 92 encloses a sucker piston which is driven by sucker rod 67 that moves vertically in an oscillatory manner. "T" shaped joint 93 and the position of "T" shaped joint 93 enable the channeling of the fluid pumped by pump 60 while additionally enabling sucker rod 67 to extend upward. The fluid pumped by pump 60 is, thus channeled through pipe section 94 and elbow joint 95 and into the inlet pipe stem (previously described). Additionally, elbow joint 95 may be replaced by an inexpensive clear joint (not shown) to provide a means for easily detecting fluid flow from supply 100.

A mechanical linkage system comprised of crank rod 65, pumpjack 64, and "Y" shaped rod 63 operatively connected and supported by journal bearings 66, 66' and 66" transmits power from crank 76 to sucker rod 67. Pumpjack hinge 66' is connected at the top of the upright member of stand 11 in order to provide a fixed fulcrum for pumpjack 64. "Y" shaped rod 63, which is pivotally connected to sucker rod 67 by means of journal bearing 66, is firmly connected to sucker rod 67 by means of "U" shaped bracket 62. Crank rod 65, which is pivotally connected to pumpjack 64 with journal bearing 66", is pivotally connected to crank 76 by means of joint 66'" that incorporates sealed ball bearings (not shown). Thus, mechanical power is transmitted to pump the fluid from supply 100.

Additionally, in order to provide a means to adjust the balance of pumpjack 64, the counterbalance of pumpjack 64 consists of box-shaped container 64' with an open top into which additional counterweights (not shown) may be added or removed. Container 64', itself, is an integral part of pumpjack 64. Through proper adjustment of the weight within container 64', the efficiency of pump 60 can, thus, be improved.

Although the present invention has been described in conjunction with the foregoing specific embodiment, many alternative variations and modifications will be apparent to those of ordinary skill in the art. Those alternatives, variations and modifications are intended to fall within the spirit and scope of the appended claims.

I claim:

1. A self-contained solar powered fluid pumping and storage unit comprising:
    a solar collector means for transforming solar energy into electrical energy;
    a fluid pumping means operatively connected to said solar collector means and operatively connectable in flow communication with a fluid supply, whereby the electrical energy is utilized to pump fluid from the fluid supply;
    a reservoir tank operatively connected in flow communication with said fluid pumping means for receiving and storing the fluid pumped by said fluid pumping means;
    a common support structure integrally connected to said solar collector means, said fluid pumping means and said reservoir tank, thereby forming a composite unit;
    means for sensing the liquid level in said reservoir tank; and
    means operatively connected to said sensing means and said fluid pumping means for shutting off power to said pumping means when the liquid level in said reservoir tank reaches a specified point.

2. The self-contained solar powered fluid pumping and storage unit of claim 1 wherein said common support structure comprises said reservoir tank.

3. The self-contained solar powered fluid pumping and storage unit of claim 2 wherein:
    said reservoir tank further comprises a top face integrally formed with the upper portion thereof; and
    said solar colelctor means and said fluid pumping means are integrally connected to and positioned above the top face of said reservoir tank, thereby providing an effective barrier from animals in the environment surrounding said unit.

4. A self-contained solar powered fluid pumping and storage unit as in claim 3 further comprising a fluid diversion means operatively connected in flow communication between said fluid pumping means and said reservoir tank, and operable to divert the fluid flowing therebetween to an alternative fluid receptor.

5. The fluid pumping and storage unit of claim 4 further comprising an actuating means operatively connected to said fluid diversion means and in communication with said reservoir tank for automatically operating said fluid diversion means in response to changes in the quantity of fluid stored within said reservoir tank with respect to a predetermined quantity.

6. The self-contained unit of claim 3, further comprising a trough, integrally connected to said common support structure and operatively connected in flow communication with said reservoir tank, for receiving and containing fluid from said reservoir tank and for availing the fluid for access by livestock, and means for regulating the flow of liquid from said reservoir tank to said trough in accordance with the liquid level in said trough.

7. A self-contained unit of claim 1 further comprising:
    a trough, integrally connected to said common support structure and operatively connected in flow communication with said reservoir tank, for receiving and containing fluid from said reservoir tank for access by livestock;
    a fluid diversion means operatively connected in flow communication between said fluid pumping means and said reservoir tank, and operable to divert the fluid flowing therebetween to an alternative fluid receptor; and an actuating means operably connected to said fluid diversion means and in communication with said resrevoir tank for automatically operating said fluid diversion means in response to changes in the quantity of fluid stored within said reservoir tank with respect to a predetermined quantity.

* * * * *